(12) United States Patent
Coulter et al.

(10) Patent No.: US 7,620,785 B1
(45) Date of Patent: Nov. 17, 2009

(54) USING ROLL-FORWARD AND ROLL-BACKWARD LOGS TO RESTORE A DATA VOLUME

(75) Inventors: Timothy R. Coulter, Morgan Hill, CA (US); Raghu Krishnamurthy, Santa Clara, CA (US); Par A. Botes, Mountain View, CA (US)

(73) Assignee: Symantec Operating Corporation, Cupertino, CA (US)

( * ) Notice: Subject to any disclaimer, the term of this patent is extended or adjusted under 35 U.S.C. 154(b) by 482 days.

(21) Appl. No.: 10/881,320

(22) Filed: Jun. 30, 2004

(51) Int. Cl.
*G06F 12/00* (2006.01)
*G06F 13/00* (2006.01)
*G06F 13/28* (2006.01)

(52) U.S. Cl. ..................... 711/161; 711/162
(58) Field of Classification Search ............. 711/161, 711/162
See application file for complete search history.

(56) References Cited

U.S. PATENT DOCUMENTS

| | | | |
|---|---|---|---|
| 5,487,160 A | 1/1996 | Bemis | 711/114 |
| 5,535,381 A | 7/1996 | Kopper | 710/52 |
| 5,835,953 A * | 11/1998 | Ohran | 711/162 |
| 6,158,019 A * | 12/2000 | Squibb | 714/13 |
| 6,161,219 A * | 12/2000 | Ramkumar et al. | 717/130 |
| 6,691,245 B1 * | 2/2004 | DeKoning | 714/6 |
| 6,732,293 B1 | 5/2004 | Schneider | 714/15 |
| 6,839,819 B2 * | 1/2005 | Martin | 711/162 |
| 6,898,688 B2 | 5/2005 | Martin et al. | 711/202 |
| 6,911,983 B2 * | 6/2005 | Sabella et al. | 345/536 |
| 6,983,352 B2 * | 1/2006 | Keohane et al. | 711/162 |
| 7,085,900 B2 | 8/2006 | Inagaki et al. | 711/162 |
| 7,257,606 B2 | 8/2007 | Kapoor et al. | 707/205 |
| 2002/0112134 A1 * | 8/2002 | Ohran et al. | 711/162 |
| 2002/0129047 A1 | 9/2002 | Cane et al. | 707/204 |
| 2003/0005235 A1 | 1/2003 | Young | 711/141 |
| 2003/0115431 A1 | 6/2003 | Hubbard et al. | 711/162 |
| 2003/0140070 A1 * | 7/2003 | Kaczmarski et al. | 707/204 |
| 2004/0034752 A1 * | 2/2004 | Ohran | 711/161 |
| 2004/0073831 A1 | 4/2004 | Yanai et al. | 714/7 |
| 2005/0027956 A1 | 2/2005 | Tormasov et al. | 711/162 |

(Continued)

FOREIGN PATENT DOCUMENTS

WO    WO 02/059749 A1    8/2002

OTHER PUBLICATIONS

Tanenbaum, Andrew, "Structured Computer Organization," Prentice Hall, 1984, pp. 10-12.

*Primary Examiner*—Sheng-Jen Tsai
(74) *Attorney, Agent, or Firm*—Campbell Stephenson LLP

(57) ABSTRACT

A roll-back memory can be used to incrementally restore one or more data volumes in reverse chronological order to the data state they occupied at some prior point in time without using a backup copy. After the one or more data volumes have been restored in reverse chronological order, a roll-forward memory can be used to incrementally restore the one or more data volumes in forward chronological order to the data state they occupied at some other point in time without using a backup copy. Incrementally restoring the one or more data volumes in reverse chronological order may follow an incremental restoration of the one or more data volumes in forward chronological order and vice versa until the one or more data volumes are in the data state they occupied just prior to, for example, a data corruption event.

22 Claims, 4 Drawing Sheets

U.S. PATENT DOCUMENTS

| | | | |
|---|---|---|---|
| 2005/0076262 A1 | 4/2005 | Rowan et al. | 714/6 |
| 2005/0076264 A1 | 4/2005 | Rowan et al. | 714/6 |
| 2006/0174074 A1 | 8/2006 | Banikazemi et al. | 711/162 |
| 2007/0250663 A1* | 10/2007 | Welsh et al. | 711/117 |

* cited by examiner

| $A_1$ | $B_2$ | C | $D_1$ | E |

| B | A | D | $B_1$ | C |
|---|---|---|---|---|
| $T_1$ | $T_2$ | $T_3$ | $T_4$ | $T_5$ |

18

| $B_1$ | $A_1$ | $D_1$ | $B_2$ | $C_1$ |
|---|---|---|---|---|
| $T_1$ | $T_2$ | $T_3$ | $T_4$ | $T_5$ |

| $A_1$ | $B_1$ | C | $D_1$ | E |

| B | A | D | $B_1$ | C |
|---|---|---|---|---|
| $T_1$ | $T_2$ | $T_3$ | $T_4$ | $T_5$ |

18

| $B_1$ | $A_1$ | $D_1$ | $B_2$ | $C_1$ |
|---|---|---|---|---|
| $T_1$ | $T_2$ | $T_3$ | $T_4$ | $T_5$ |

| $A_1$ | $B_1$ | C | D | E |

| B | A | D | $B_1$ | C |
|---|---|---|---|---|
| $T_1$ | $T_2$ | $T_3$ | $T_4$ | $T_5$ |

18

| $B_1$ | $A_1$ | $D_1$ | $B_2$ | $C_1$ |
|---|---|---|---|---|
| $T_1$ | $T_2$ | $T_3$ | $T_4$ | $T_5$ |

| A | $B_1$ | C | D | E |

| B | A | D | $B_1$ | C |
|---|---|---|---|---|
| $T_1$ | $T_2$ | $T_3$ | $T_4$ | $T_5$ |

18

| $B_1$ | $A_1$ | $D_1$ | $B_2$ | $C_1$ |
|---|---|---|---|---|
| $T_1$ | $T_2$ | $T_3$ | $T_4$ | $T_5$ |

| $A_1$ | $B_1$ | C | D | E |

| B | A | D | $B_1$ | C |
|---|---|---|---|---|
| $T_1$ | $T_2$ | $T_3$ | $T_4$ | $T_5$ |

| $B_1$ | $A_1$ | $D_1$ | $B_2$ | $C_1$ |
|---|---|---|---|---|
| $T_1$ | $T_2$ | $T_3$ | $T_4$ | $T_5$ |

FIG. 7a

| $A_1$ | $B_1$ | C | $D_1$ | E |

| B | A | D | $B_1$ | C |
|---|---|---|---|---|
| $T_1$ | $T_2$ | $T_3$ | $T_4$ | $T_5$ |

| $B_1$ | $A_1$ | $D_1$ | $B_2$ | $C_1$ |
|---|---|---|---|---|
| $T_1$ | $T_2$ | $T_3$ | $T_4$ | $T_5$ |

FIG. 7b

USING ROLL-FORWARD AND ROLL-BACKWARD LOGS TO RESTORE A DATA VOLUME

BACKGROUND OF THE INVENTION

Businesses or other entities store their operational data (e.g., customer lists, financial transactions, business documents, business transactions, etc.) in logical volumes on memory devices such as hard disks. Unfortunately, the operational data is susceptible to corrupting events such as hardware failure, software failure, or user error. Hardware failures can range from the failure of a single hard disk to the destruction of an entire data center containing the hard disk, making some or all of the business's operational data unrecoverable. Software failures are procedural errors in an application that corrupt operational data. User errors include errors such as inadvertent deletion or overwriting of operational data that is later required. Failures and user errors often result in the loss or corruption of important operational data. The loss or corruption of operational data is particularly devastating to a business that relies heavily on electronic commerce.

Recognizing the importance of maintaining reliable operational data, businesses or other entities typically employ backup and restore systems to protect critical operational data against corruption. Backup systems create backup copies of operational data. A backup copy captures an image of the operational data at an instant in time so that if need be, everything that has happened to the operational data since that instant can be forgotten, and the state of operations (as reflected in the operational data) can be restored to that instant.

While it is a simple and fairly quick procedure to create a backup copy of an individual data object (image file, text file, etc.) the creation of a backup copy becomes more difficult as the amount of operational data increases. One method of creating a backup copy of a large volume of operational data is to copy the data from the hard disks that store the volume to one or more magnetic tapes. Once the backup has completed, the magnetic tapes are stored either locally or remotely. When a data corruption is detected in the operational data volume as a result of hardware failure, software failure, or user error, the volume is restored to its pre-corrupted data state using the backup copy.

Backup operations create backup copies that may be either full or incremental. A full backup copy means that all files in the data volume are copied regardless of how recently the files have been modified or whether a previous backup copy exists. An incremental backup means that only files of the volume that have changed since some previous event (e.g., a prior full backup or incremental backup) are copied. The backup window for a full backup tends to be much larger when compared to the backup window for an incremental backup. For most applications, incremental backups are preferable at backup times since, in most cases, the number of files of the data volume that change between backups is very small compared to the number of files in the entire data volume and since the backup window is small. If backups are done daily or even more frequently, it is not uncommon for less than 1% of files of a volume to change between backups. An incremental backup in this case copies 1% of the data that a full backup would copy and uses 1% of the input/output (IO) resources between the hard disks and the backup magnetic tapes.

Incremental backup appears to be the preferred mode of protecting data. And so it is, until a full restore of all the files of the data volume is needed. A full restore from incremental backups requires starting with a restore using the newest full backup copy, followed by restores of all newer incremental backups. That can require a lot of magnetic tape handling performed by, for example, an automated robotic handler.

Restore from full backups is genuinely simpler and more reliable than restores from combinations of full and incremental backups. When recovering from individual user errors, the situation is just the opposite. Users tend to work with one small set of files for a period of days or weeks and then work with a different set. Accordingly, there is a high probability that a file erroneously corrupted by a user will have been used recently and therefore will be copied in one of the incremental backups. Since incremental backups contain a smaller fraction of data when compared to a full backup, the incremental backups can usually be searched much faster for the target file if a restore is required. From the individual user's standpoint, it is preferable to create many small incremental backups.

While backup and restore systems are useful, they present a number of disadvantages. Backups are typically created during "backup windows." During backup windows, application access to the volume is unfortunately denied while the volume is being backed up to one or more magnetic tapes. Additionally, even if an incremental backup is created at the top of every hour, a data corruption operation that occurs at 12:59 as a result of human error would require the data volume to be restored to the backup created at 12:00, and all valid modifications of the data volume entered between 12:00 and 12:59 would be lost.

SUMMARY OF THE INVENTION

A roll-back memory can be used to incrementally restore one or more data volumes in reverse chronological order to the data state they occupied at some prior point in time without using a backup copy. After the one or more data volumes have been restored in reverse chronological order, a roll-forward memory can be used to incrementally restore the one or more data volumes in forward chronological order to the data state they occupied at some other point in time without using a backup copy. Incrementally restoring the one or more data volumes in reverse chronological order may follow an incremental restoration of the one or more data volumes in forward chronological order and vice versa until the one or more data volumes are in the data state they occupied just prior to, for example, a data corruption event.

BRIEF DESCRIPTION OF THE DRAWINGS

The present invention may be better understood, and its numerous objects, features, and advantages made apparent to those skilled in the art by referencing the accompanying drawings.

FIGS. 5a-5d illustrates the data state of the data volume V after repeatedly performing the process shown in FIG. 4;

FIGS. 7a and 7b illustrates the data state of the data volume V after repeatedly performing the process shown in FIG. 6.

The use of the same reference symbols in different drawings indicates similar or identical items.

DETAILED DESCRIPTION

The present invention relates to a system or method for restoring one or more data volumes to a prior data state. Although the present invention will be described with reference to restoring data on the volume level, the present invention may find application in restoring data on the file system or database level. In one embodiment, the present invention can be employed without need of traditional backup copies. For purposes of explanation, the present invention will be described with reference to restoring one data volume V, it being understood that the present invention should not be limited thereto. Indeed, the present invention can be used to restore several non-temporal volumes to the data states they occupied at a prior point in time.

Figure 1:
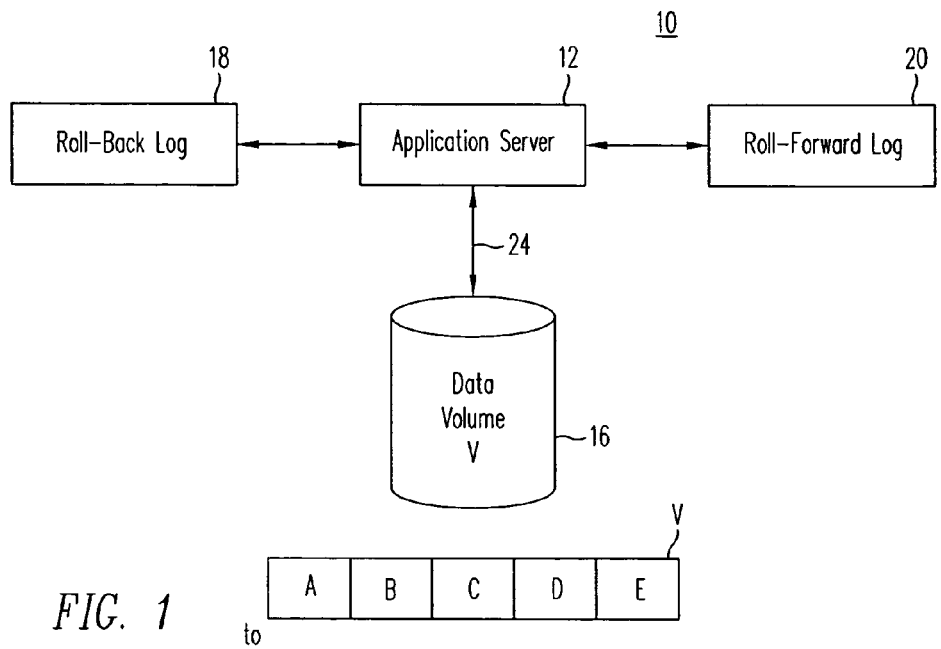
FIG. 1 shows a block diagram of relevant components in a data processing system employing one embodiment of the present invention.

FIG. 1 illustrates relevant components of a system 10 employing one embodiment of the present invention. The system 10 shown in FIG. 1 includes a computer system 12 coupled directly or indirectly to a memory system 16 that stores data volume V. Computer system 12 can be any computer or other data processing device. For example, computer system 12 can be a conventional personal computer, a server, a special purpose computer, or the like. For purposes of explanation, computer system 12 takes from in a server having one or more processors for executing instructions of an application program. The application program generates transactions to directly or indirectly read data from or write data to the data volume V. A write data transaction is completed by overwriting existing data $D_{old}$ in one or more data blocks of volume V with new data $D_{new}$. For ease of explanation, it will be presumed that each write transaction, when completed, overwrites all existing data $D_{old}$ in a single block of volume V with new data $D_{new}$, it being understood that the present invention should not be limited thereto. When a write transaction completes, there may be very little difference between existing data $D_{old}$ and new data $D_{new}$.

Transaction requests to read or write data are transmitted directly or indirectly to the memory system 16. It is noted that server 12 communicates directly or indirectly with memory system 16 via communication link 24. Communication link 24 may take form in a storage area network (SAN) having one or more components such as switches, hubs, routers (not shown), etc. It is noted that additional components (e.g., a database management system, a file system, a volume manager, etc.) may be in data communication between server 12 and memory system 16, even though such components are not shown within FIG. 1.

Memory system 16 may take form in one or more disk arrays or other storage devices, it being understood that the term "memory system" should not be limited thereto. For purposes of explanation, it will be presumed that memory system 16 takes form in a single disk array that stores logical data volume V. Volume V consists of $n_{max}$ data blocks each storing data. The $n_{max}$ data blocks do not actually store data. Rather, physical memory blocks of hard disks within the disk array 16 are allocated to store data of corresponding data blocks by virtualizing software executing on the disk array and/or by a volume manager (both of which are not shown).

FIG. 1 provides a graphical representation of five data blocks designated 1-5 of Volume V. Data in the volume blocks are accessible directly or indirectly by server 12 via a write or read data transaction. FIG. 1 shows the state of five memory blocks at an initial time $t_0$.

FIG. 1 also shows memory devices 18 and 20 coupled to and accessible by server 12. For purposes of explanation only, each of the memory devices 18 and 20 will take form in random access memory (RAM), it being understood that the present invention should not be limited thereto. Memory devices 18 and 20 may be configured as sequential logs, it being understood that the memory devices 18 and 20 should not be limited thereto. Data is read from sequential logs in the order in which the data is stored therein. Thus, the last data item stored in a sequential log is the first to be read out, and the first data item stored in a sequential log is the last to be read out.

Memory device 18 is designated as roll-back log while memory device 20 is designated as roll-forward log. Roll-back log 18 stores or is configured to store existing data $D_{old}$ copied from blocks of volume V before $D_{old}$ is overwritten with new data $D_{new}$ of a write transaction. The roll-forward log 20 stores or is configured to store copies of the new data $D_{new}$. In one embodiment, the roll-forward log 20 may take form in a storage replication log (SRL). SRLs are typically used in systems for replicating data volumes.

Before or after existing data $D_{old}$ is copied to roll-back log 18, in one embodiment, existing data $D_{old}$ may be compressed according to any one of many well-known compression algorithms. Such compression would reduce the amount of storage space within roll-back log 18 needed to store data. Further, before or after new data $D_{new}$ is copied to roll-forward log 20, new data $D_{new}$ may also be compressed. For purposes of explanation only, it will be presumed that data is stored in logs 18 and 20 in compressed format.

Figure 2:
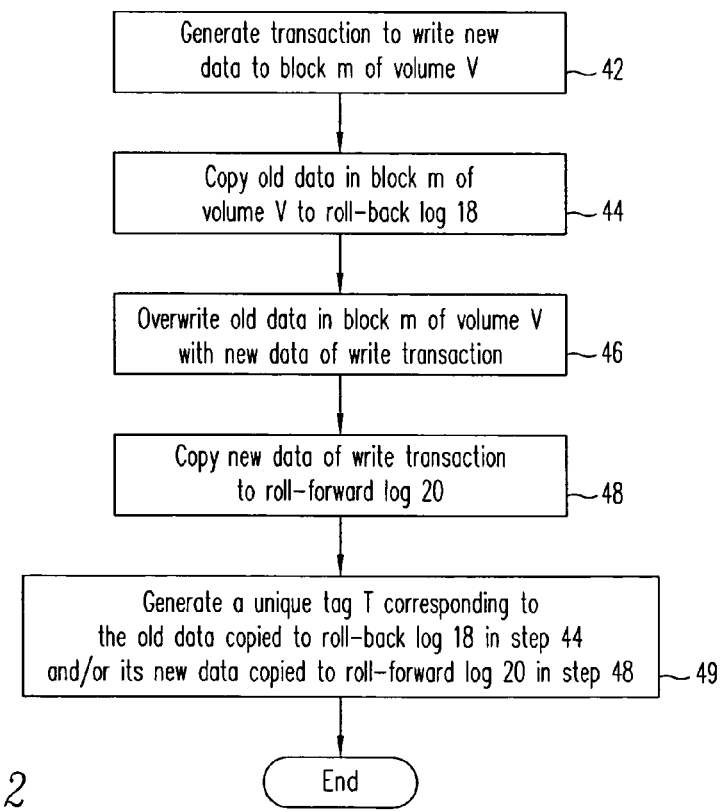
FIG. 2 illustrates relevant aspects of writing data to roll-back and roll-forward logs of FIG. 1 in accordance with one embodiment of the present invention.

Before existing data $D_{old}$ in any block in volume V is overwritten with a new data $D_{new}$, the existing data $D_{old}$ is copied to roll-back log 18. The new data $D_{new}$ is copied to the roll-forward log 20 either before the existing data $D_{old}$ is overwritten or after the existing data is overwritten. FIG. 2 describes this process in greater detail. The process shown in FIG. 2 can be implemented by server 12 executing instructions stored in memory (not shown). The process starts with step 42 when server 12 generates a transaction to overwrite existing data $D_{old}$ in block m of volume V with new data $D_{new}$. In step 44, before the existing data $D_{old}$ in block m is overwritten with the new data $D_{new}$, the old data $D_{old}$ is copied to roll-back log 18. In step 46 existing data $D_{old}$ in block m is overwritten with the new data $D_{new}$. In step 48 a copy of the new data $D_{new}$ is stored in roll-forward log 20. It is noted that steps 46 and 48 may be reversed in order. Lastly, a tag Tm is generated that corresponds to the existing data $D_{old}$ written to log 18 and/or the new data $D_{new}$ written to roll-forward log 20. A new tag Tm is generated each time data is copied to logs 18 and/or 20. The tag number m is generated sequentially so that sequentially generated tags have sequential tag numbers. Tag Tm may include a time stamp. For purposes of explanation, the time stamp will be presumed to identify the time when existing data $D_{old}$ is overwritten with the new data $D_{new}$. In the alternative, the time stamp may identify the time the write transaction of step 42 was generated, the time when the old data $D_{old}$ is written to roll-back log 18, or some other event in the process of FIG. 2. Tag Tm may also include an identification of the data block (i.e., block m) in volume V that is the target of the corresponding write transaction. In the embodiment where more than one data volume is restored using the present invention, the tag may include an identification of the volume that contains the target block of the corresponding write transaction. In the embodiment where more than one data block is the target of a corresponding write data transaction, the tag may include an identification of the first data block and a number of consecutive blocks including the first block where the new data $D_{new}$ is written. Tag Tm may also include information (e.g., a flag set to binary one or zero) indicating that data has or has not been stored within roll-back log 18 and/or roll-forward log 20 in compressed format. The tag Tm may be stored with the existing data $D_{old}$ copied to log 18, the new data $D_{new}$ copied to log 20, or both. In the alternative, tag Tm may be stored in a separate tag table. Each tag T, however, is associated with a respective block of existing data $D_{old}$ stored in roll-back log 18 and/or a respective block of new data $D_{new}$ stored in roll-forward log 20. It is noted that other information may be included within the tags. It is noted that the application executing on server 12 may access data in volume V while existing data within volume V is copied to roll-back log 18 or while new data is copied to roll-forward log 20.

At time $t_0$ it is presumed that a backup copy of the data Volume V has been stored in a memory device (not shown). The present invention does not require the creation of a backup copy of data Volume V. The backup copy of the data Volume V can be generated in any desired manner. A backup copy of data Volume V enables restoration of data volume V to the state it occupied at time $t_0$. More particularly, data volume V can be restored to its prior state by overwriting the contents of Volume V with the backup copy.

Figure 3A:
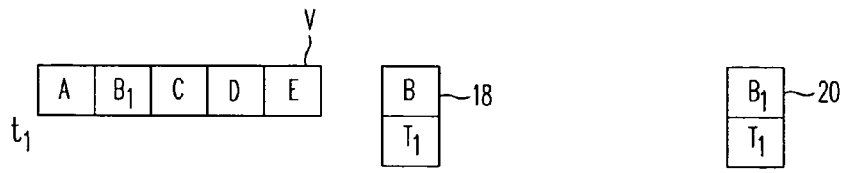
FIGS. 3a-3e illustrates the data state of a portion of a data volume V after repeatedly performing the process shown in FIG. 2.

FIGS. 3a-3d illustrate changes to the data contents of Volume V, roll-back log 18, and roll-forward log 20 after completing five consecutive write transactions. More particularly, after time $t_0$, server 12 generates a first write data transaction to overwrite existing data (designated B) in block 2 of volume V with new data (designated $B_1$). Before existing data B of block 2 is overwritten, data B is copied to roll-back log 18 in accordance with step 44 of FIG. 2. Data B is stored in roll-forward log 18 in compressed format. The existing data B in block 2 of volume V is then overwritten with the new data $B_1$. The new data $B_1$ is copied to roll-forward log 20 either before or after existing data B is overwritten. Data $B_1$ is stored in roll-forward log 20 in compressed format. Lastly, server 12 generates a tag T1 which it stores along with new data B1 in roll-forward log 20 and/or with existing data B in roll-back log 18. Tag T1 includes the identification of the target block (e.g., block 2) of the first write transaction. Additionally, tag T1 includes time stamp set to time $t_1$, the time when data B was overwritten in volume V. FIG. 3a shows the state of Volume V, roll-back log 18, and roll-forward log 20 after completion of the first write transaction and the process steps shown in FIG. 2.

Figure 3B:
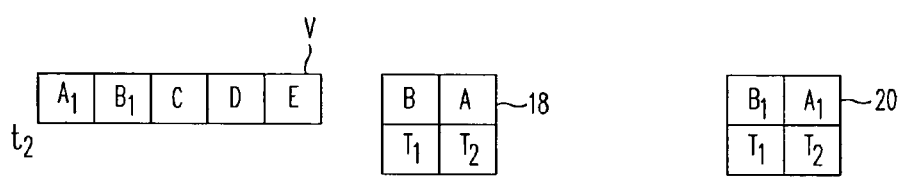

After server 12 generates the first write transaction, server 12 generates a second write transaction to overwrite existing data (designated A) in block 1 of Volume V with new data (designated $A_1$). Before existing data A of block 1 is overwritten, data A is copied to roll-back log 18. The existing data A in block 1 of volume V is then overwritten with the new data $A_1$ of the second write transaction. The new data $A_1$ is copied to roll-forward log 20 either before or after existing data A is overwritten. New data $A_1$ and existing data A are stored in compressed format in logs 20 and 18, respectively. Lastly, server 12 generates a tag T2 which it stores along with new data A1 in roll-forward log 20 and/or with existing data A in roll-back log 18. Tag T2 includes the identification of the target block (e.g., block 1) of the second write transaction. Additionally, tag T2 includes time stamp set to time $t_2$, the time when data A is overwritten in volume V. FIG. 3b shows the state of Volume V, roll-back log 18, and roll-forward log 20 after completion of the second write transaction and the process steps shown in FIG. 2.

Figure 3C:
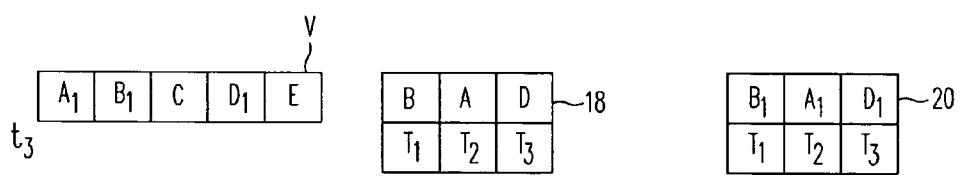

Server 12 continues to generate new write transactions after generating the second write transaction. After time $t_2$ server 12 generates a third write transaction to overwrite existing data (designated D) in block 4 of Volume V with new data (designated $D_1$). It will be presumed for sake of explanation of the present invention that the third write transaction was generated in error thereby corrupting data volume V. Before existing data D of block 4 is overwritten, data D is copied to roll-back log 18. The existing data D in block 2 of volume V is then overwritten with the new data $D_1$ of the third write transaction. The new data $D_1$ is copied to roll-forward log 20 either before or after existing data D is overwritten. New data $D_1$ and existing data D are stored in compressed format in logs 20 and 18, respectively. Lastly, server 12 generates a tag T3 which it stores along with new data $D_1$ in roll-forward log 20 and/or with a copy of existing data D in roll-back log 18. Tag T3 includes the identification of the target block (e.g., block 4) of the third write transaction. Additionally, tag T3 includes time stamp set to time $t_3$, the time when data D is overwritten in volume V. FIG. 3c shows the state of Volume V, roll-back log 18, and roll-forward log 20 after completion of the third write transaction and the process steps shown in FIG. 2. Data $D_1$ represents corrupted data.

Figure 3D:
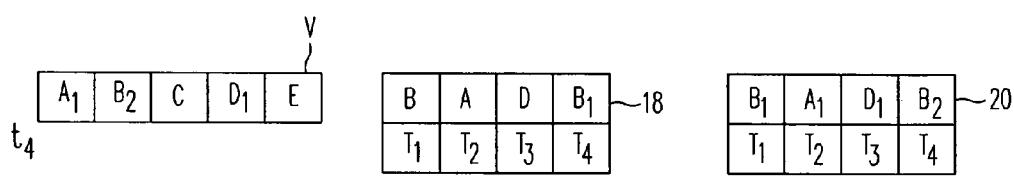

Server 12 generates a fourth write transaction to overwrite existing data $B_1$ in block 2 of Volume V with new data (designated $B_2$). Before existing data $B_1$ of block 2 is overwritten, data $B_1$ is copied to roll-back log 18. The existing data $B_1$ in block 2 of volume V is then overwritten with the new data $B_2$ of the fourth write transaction. The new data $B_2$ is copied to roll-forward log 20 either before or after existing data $B_1$ is overwritten in volume V. New data $B_2$ and existing data $B_1$ are stored in compressed format in logs 20 and 18, respectively. Lastly, server 12 generates a tag T4 which it stores along with new data $B_2$ in roll-forward log 20 and/or with a copy of existing data $B_1$ in roll-back log 18. Tag T4 includes the identification of the target block (e.g., block 2) of the fourth write transaction. Additionally, tag T4 includes time stamp set to time $t_4$, the time when data $B_1$ is overwritten in volume V. FIG. 3d shows the state of Volume V, roll-back log 18, and roll-forward log 20 after completion of the fourth write transaction and the process steps shown in FIG. 2.

Figure 3E:
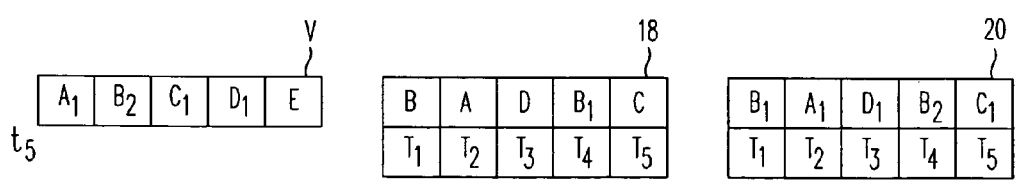

Lastly in the illustrated example, server 12 generates a fifth write transaction to overwrite existing data (designated C) in block 3 of Volume V with new data (designated $C_1$). Before existing data C of block 3 is overwritten, data C is copied to roll-back log 18. Once data C has been copied to roll-back log 18, data within block 3 of Volume V is overwritten with the new data $C_1$ in accordance with the fifth write transaction. The new data $C_1$ is copied to roll-forward log 20 either before or after existing data C is overwritten. Lastly, server 12 generates a tag T5 which it stores along with new data C1 in roll-forward log 20 and/or with a copy of existing data C in roll-back log 18. Tag T5 includes the identification of the target block (e.g., block 3) of the fifth write transaction. Additionally, tag T5 includes time stamp set to time $t_5$, the time when data C is overwritten in volume V. FIG. 3e shows the state of Volume V, roll-back log 18, and roll-forward log 20 after completion of the fifth write transaction and the process steps shown in FIG. 2.

Figure 4:
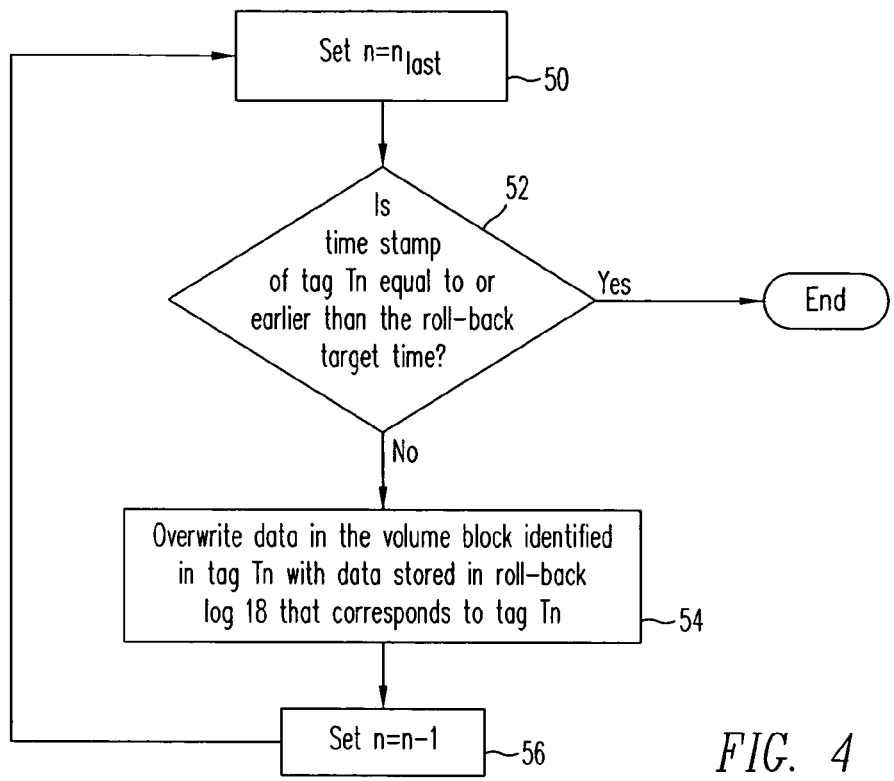
FIG. 4 illustrates relevant aspects of incrementally restoring data volume V in reverse chronological order to the data state it occupied at some prior point in time using the roll-back log of FIG. 1.

FIG. 3e illustrates the state of Volume V, rewind log 18, and forward log 20 after completion of five sequentially generated write transactions. After $t_5$, it may be desirable to restore volume V to the data state it occupied at some time prior to time $t_5$. For instance, roll-back log 18 can be used to incrementally restore volume V to the state it occupied at time $t_1$. As will be more fully described below, roll-back log 18 can be used to incrementally restore volume V to a prior point in time in reverse chronological order without using a backup copy. After volume V has been restored in reverse chronological order, roll-forward log 20 can be used to incrementally restore volume V in forward chronological order without using a backup copy. Incrementally restoring volume V in reverse chronological order may follow an incremental restoration of volume V in forward chronological order and vice versa until volume V is in the data state it occupied just prior to, for example, a data corruption event. FIG. 4 illustrates operational aspects of using roll-back log 18 to incrementally restore data volume V in reverse chronological order.

The process shown in FIG. 4 can be implemented by server 12 executing instructions stored in memory (not shown). Before the process is started, a roll-back target time is selected to which the data volume V is to be incrementally restored in reverse chronological order. Once the roll-back target time is selected, the data volume restoration operation in FIG. 4 begins by setting a dummy variable n to $n_{last}$ where $n_{last}$ represents the tag number of the last tag generated in step 49 of FIG. 2. In the illustrated example, $n_{last}$ equals 5. In step 52, server 12 compares the selected roll-back target time with the time stamp contained in tag Tn. If the time stamp is greater than the roll-back target time, server 12 overwrites the data in the volume block identified in tag Tn with a copy of the data from roll-back log 18 corresponding to tag Tn. After the volume block is updated with data from roll-back log 18, server 12 decrements dummy variable n by 1 in step 56. Steps 52-56 are repeated until the time stamp of tag Tn is less than or equal to the roll-back target time in step 52. When the condition is met in step 52, the process ends.

The process shown in FIG. 4 can be used to incrementally restore volume V in reverse chronological order from its data state as shown in FIG. 3e to the data state it occupied at, for example, time $t_1$ (see FIG. 3a). With the roll-back target time set to $t_1$, the data restoration operation begins with server 12 setting dummy variable n to 5, the value of $n_{last}$. Accordingly, server 12 accesses tag T5. Tag T5 indicates that data C was copied from block 3 of volume V. Data C stored in roll-back log 18 corresponds to tag T5. Server 12 overwrites the existing data $C_1$ in block 3 of volume V with a copy of data C stored in roll-back log 18 in accordance with step 54 of FIG. 4. Once block 3 is overwritten with data C, as shown in FIG. 5a, volume V has been restored to the data state it occupied at time $t_4$. Server 12 decrements n from 5 to 4, and server 12 accesses the next tag T4 and compares the time stamp $t_4$ in tag T4 with the roll-back target time $t_1$. Because $t_4$ is later in time, volume V has not been restored back to the roll-back target time. Tag T4 indicates that data $B_1$ was copied from block 2 of volume V. Data $B_1$ stored in roll-back log 18 corresponds to tag T4. Server 12 overwrites the existing data $B_2$ in block 2 of volume V with a copy of data $B_1$ stored in roll-back log 18 in accordance with step 54 of FIG. 4. Once block 2 is overwritten with data $B_1$, volume V has been restored to the data state it occupied at time $t_3$ as shown in FIG. 5b. Server 12 decrements n from 4 to 3, and server 12 accesses the next tag T3. Server 12 then compares the time stamp $t_3$ in tag T3 with the roll-back target time $t_1$. Because $t_3$ is later in time, volume V has not been restored back to the roll-back target time. Tag T3 indicates that data D was copied from block 4 of volume V. Data D stored in roll-back log 18 corresponds to tag T3. Server 12 overwrites the existing data $D_1$ in block 4 of volume V with a copy of data D stored in roll-back log 18 in accordance with step 54 of FIG. 4. Once block 4 is overwritten with data D, volume V has been restored to the data state it occupied at time $t_2$ as shown in FIG. 5c. Server 12 decrements n from 3 to 2, and server 12 accesses the next tag T2. Server 12 then compares the time stamp $t_2$ in tag T2 with the roll-back target time $t_1$. Because $t_2$ is later in time, volume V has not been restored back to the roll-back target time. Tag T2 indicates that data A was copied from block 1 of volume V. Data A stored in roll-back log 18 corresponds to tag T2. Server 12 overwrites the existing data $A_1$ in block 1 of volume V with a copy of data A stored in roll-back log 18 in accordance with step 54 of FIG. 4. Once block 1 is overwritten with data $B_1$, volume V has been restored to the data state it occupied at time $t_1$ as shown in FIG. 5d. Server 12 decrements n from 2 to 1, and server 12 accesses the next tag T1. Server 12 then compares the time stamp $t_1$ in tag T1 with the roll-back target time $t_1$. Because these two times are equal, volume V has been restored back to the roll-back target time and the incremental, reverse chronological restore process ends of FIG. 4 ends, at least for the moment.

Figure 6:
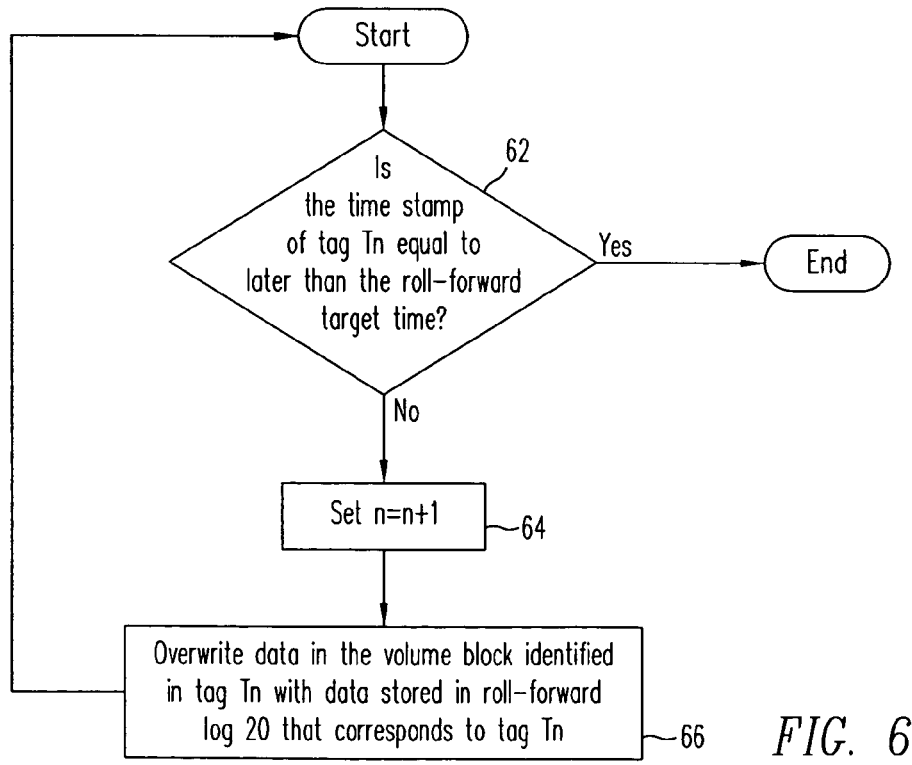
FIG. 6 illustrates relevant aspects of incrementally restoring data volume V in forward chronological order to the data state it occupied at some other point in time using the roll-forward log of FIG. 1.

As noted above, the roll-back log 18 can be used to incrementally restore volume V in reverse chronological order. It is possible that volume V as been inadvertently restored to a point in time that is much earlier then needed to correct a data corruption. Volume V can be checked for corruption either by server 12 or manually. If the volume does not contain corrupted data, then in all probability volume V has been restored to a point in time earlier than the time when the corruption occurred. In this case, roll-forward log 20 can be used to incrementally restore volume V in forward chronological order. For instance, after volume V has been restored to the data state it occupied at time $t_1$, roll-forward log 20 can be used to incrementally restore volume V to the state it occupied at, for example, time $t_3$. FIG. 6 illustrates operational aspects of using roll-forward log 20 to incrementally restore data volume V in forward chronological order.

The process shown in FIG. 6 can be implemented by server 12 executing instructions stored in memory (not shown). Before the process is started, a roll-forward target time is selected to which the data volume V is to be incrementally restored in forward chronological order. The processes in FIGS. 4 and 6 share the same dummy variable n. Thus, the value of n in the process of FIG. 6 starts out equal to the value of n when the process of FIG. 4 ends. In step 62, server 12 compares the selected roll-forward target time with the time stamp contained in tag Tn. If the time stamp is earlier in time than the roll-forward target time, server 12 increments n by 1 and then overwrites the data in the volume block identified in tag Tn with a copy of the corresponding data from roll-forward log 20 as shown in steps 64 and 66. Steps 62-66 are repeated until the time stamp of tag Tn is latter than or equal in time to the roll-forward target time in step 62. When the condition is met in step 62, the process of FIG. 6 ends, at least for the moment.

The process shown in FIG. 6 can be used to incrementally restore volume V in forward chronological order from the data state shown in FIG. 5d to the data state it occupied at, for example, time $t_3$ (see FIG. 3c). In the illustrated example, n equals 1 when the process of FIG. 6 is first started since n was equal to 1 when the process shown in FIG. 6 last ended. Server 12 accesses tag T1 which contains a time stamp equal to $t_1$. Because roll-forward target time $t_3$ is later in time than $t_1$, dummy variable n is incremented so that n=2, and server 12 accesses the tag T2. The data $A_1$ stored in roll-forward log 20 corresponds to tag T2. Tag T2 indicates that block 1 of volume V was overwritten with data $A_1$ at time $t_2$. Server 12 overwrites the existing data A in block 1 of volume V with a copy of data $A_1$ stored in roll-forward log 20 in accordance with step 66 of FIG. 6. Once block 1 is overwritten with data $A_1$, volume V has been restored to the data state it occupied at time $t_2$ as shown in FIG. 7a. Server 12 then compares the time stamp $t_2$ in tag T2 with the roll-forward target time $t_3$. Because $t_3$ is later in time, volume V has not been restored to the roll-forward target time. As such, variable n is incremented so that n=3, and server 12 accesses tag T3. Data $D_1$ stored in roll-forward log 20 corresponds to tag T3. Tag T3 indicates that block 4 of volume V was overwritten with data $D_1$ at time $t_3$. Server 12 overwrites the existing data D in block 4 of volume V with a copy of data $D_1$ stored in roll-forward log 20 in accordance with step 66 of FIG. 6. Once block 4 is overwritten with data $D_1$, volume V has been restored to the data state it occupied at time $t_3$ as shown in FIG. 7b. Server 12 then compares the time stamp $t_3$ in tag T3 with the roll-forward target time $t_3$. Because $t_3$ equates to the roll-forward target time, volume V has been restored and the process of FIG. 6 ends.

Using the process of FIG. 4 or a combination of the processes of FIGS. 4 and 6, volume V can be restored to the data state it occupied at a prior point in time. For example, volume V can be restored to the data state it occupied at time $t_2$, just prior to data corruption. As can be understood, when the number of write transactions to volume V may become large, and the number of data blocks stored in logs 18 and 20 can increase rapidly. At some point, it may be necessary to create another backup copy of the volume V, and erase or invalidate the contents of logs 18 and 20. The roll-forward log may be instrumental in creating another full backup of volume V. More particularly, server 12 or an independent computer system dedicated to performing backup operations may use the roll-forward log 20 to update the current full backup mentioned above. When all data of the roll-forward log 20 is applied to the current full backup copy in the order in which data was received in roll-forward log 20, a new full backup copy of volume V results, and logs 18 and 20 can be emptied or their contents invalidated.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    (a) overwriting old first data in a data volume with new first data;
    (b) storing a copy of the old first data in a roll-back memory, wherein (b) occurs before (a);
    (c) storing a copy of the new first data in a roll-forward memory;
    (d) overwriting old second data in the data volume with new second data, wherein (d) occurs after (a);
    (e) storing a copy of the old second data in the roll-back memory, wherein (e) occurs before (d);
    (f) storing a copy of the new second data in the roll-forward memory;
    (g) overwriting the new second data in the data volume with a copy of the old second data from the roll-back memory, wherein (g) occurs after (d);
    (h) overwriting the new first data in the data volume with a copy of the old first data from the roll-back memory, wherein (h) occurs after (g);
    (i) overwriting the old first data in the data volume with a copy of the new first data stored in the roll-forward memory, wherein (i) occurs after (h);
    (j) overwriting the old second data in the data volume with a copy of the new second data from the roll-forward memory, wherein (j) occurs after (i) and (g).

2. A method comprising:
    (a) overwriting old first data in a first volume with new first data;
    (b) storing a copy of the old first data in a roll-back memory, wherein (b) occurs before (a);
    (c) storing a copy of the new first data in a roll-forward memory;
    (d) overwriting old second data in a second volume with new second data, wherein (d) occurs after (a);
    (e) storing a copy of the old second data in the roll-back memory, wherein (e) occurs before (d);
    (f) storing a copy of the new second data in the roll-forward memory, wherein the old first data and old second data were contained in the first data volume and the second data volume, respectively, before (a);
    (g) overwriting the new second data in the second data volume with a copy of the old second data from the roll-back memory, wherein (g) occurs after (d);
    (h) overwriting the new first data in the first data volume with a copy of the old first data from the roll-back memory, wherein (h) occurs after (g);
    (i) overwriting the old first data in the first data volume with a copy of the new first data stored in the roll-forward memory, wherein (i) occurs after (h);
    (j) overwriting the old second data in the second data volume with a copy of the new second data from the roll-forward memory, wherein (j) occurs after (i) and (g).

3. The method of claim 1 further comprising compressing the copy of the old first data stored in the roll-back memory.

4. The method of claim 1 further comprising:
    generating a first request to overwrite the old first data with new first data;
    wherein (a) occurs in response to the generation of the first request;
    generating a second request to overwrite the old second data with new second data;
    wherein (d) occurs in response to the generation of the second request;
    wherein, after (h) occurs, the data volume is restored to the data state it occupied before the first request was generated.

5. A computer readable memory for storing instructions executable by a computer system, wherein the computer system implements a method in response to executing the instructions, the method comprising:
    (a) overwriting old first data in a data volume with new first data;
    (b) storing a copy of the old first data in a first memory, wherein (b) occurs before (a);
    (c) storing a copy of the new first data in a second memory;
    (d) overwriting old second data in the data volume with new second data, wherein (d) occurs after (a);
    (e) storing a copy of the old second data in the first memory, wherein (e) occurs before (d);
    (f) storing a copy of the new second data in the second memory, wherein the old first data and the old second data were contained in the data volume before (a);
    (g) overwriting the new second data in the data volume with a copy of the old second data from the first memory, wherein (g) occurs after (d);
    (h) overwriting the new first data in the data volume with a copy of the old first data from the first memory, wherein (h) occurs after (g);

(i) overwriting the old first data in the data volume with a copy of the new first data stored in the second memory, wherein (i) occurs after (h);

(j) overwriting the old second data in the data volume with a copy of the new second data from the second memory, wherein (j) occurs after (i) and (g).

6. A computer readable memory for storing instructions executable by a computer system, wherein the computer system implements a method in response to executing the instructions, the method comprising:

(a) overwriting old first data in a first volume with new first data;

(b) storing a copy of the old first data in a first memory, wherein (b) occurs before (a);

(c) storing a copy of the new first data in a second memory;

(d) overwriting old second data in a second volume with new second data, wherein (d) occurs after (a);

(e) storing a copy of the old second data in the first memory, wherein (e) occurs before (d);

(f) storing a copy of the new second data in the second memory, wherein the old first data and old second data were contained in the first data volume and the second data volume, respectively, before (a);

(g) overwriting the new second data in the second data volume with a copy of the old second data from the first memory, wherein (g) occurs after (d);

(h) overwriting the new first data in the first data volume with a copy of the old first data from the first memory, wherein (h) occurs after (g);

(i) overwriting the old first data in the first data volume with a copy of the new first data stored in the second memory, wherein (i) occurs after (h);

(j) overwriting the old second data in the second data volume with a copy of the new second data from the second memory, wherein (j) occurs after (i) and (g).

7. The computer readable memory of claim 5 wherein the method further comprises compressing the copy of the old first data stored in the first memory.

8. The computer readable memory of claim 5 wherein the method further comprises:

generating a first request to overwrite the old first data with new first data;

wherein (a) occurs in response to generation of the first request;

generating a second request to overwrite the old second data with new second data;

wherein (d) occurs in response to generation of the second request;

wherein, after (h) occurs, the data volume is restored to the data state it occupied before the first request was generated.

9. The computer readable memory of claim 5 wherein the method further comprises associating a first time stamp with the copy of the old first data stored in the first memory.

10. The computer readable memory of claim 9 wherein the method further comprises associating the first time stamp with the copy of the new first data stored in the second memory.

11. An apparatus comprising:

a computer system coupled to first and second memory devices;

an instruction memory for storing instructions executable by the computer system, wherein the computer system implements a method in response to executing the instructions the method comprising:

(a) overwriting old first data in a data volume with new first data;

(b) storing a copy of the old first data in a roll-back memory, wherein (b) occurs before (a);

(c) storing a copy of the new first data in a roll-forward memory;

(d) overwriting old second data in the data volume with new second data, wherein (d) occurs after (a);

(e) storing a copy of the old second data in the roll-back memory, wherein (e) occurs before (d);

(f) storing a copy of the new second data in the roll-forward memory, wherein the old first data and the old second data were contained in the data volume before (a);

(g) overwriting the new second data in the data volume with a copy of the old second data from the roll-back memory, wherein (g) occurs after (d);

(h) overwriting the new first data in the data volume with a copy of the old first data from the roll-back memory, wherein (h) occurs after (g);

(i) overwriting the old first data in the data volume with a copy of the new first data stored in the roll-forward memory, wherein (i) occurs after (h);

(j) overwriting the old second data in the data volume with a copy of the new second data from the roll-forward memory, wherein (j) occurs after (i) and (g).

12. The method of claim 2 further comprising compressing the copy of the old first data stored in the roll-back memory.

13. The method of claim 2 further comprising:

generating a first request to overwrite the old first data with new first data, wherein (a) occurs in response to the generation of the first request;

generating a second request to overwrite the old second data with new second data, wherein (d) occurs in response to the generation of the second request;

wherein, after (h) occurs, the data volume is restored to the data state it occupied before the first request was generated.

14. The computer readable memory of claim 6 wherein the method further comprises compressing the copy of the old first data stored in the first memory.

15. The computer readable memory of claim 6 wherein the method further comprises:

generating a first request to overwrite the old first data with new first data, wherein (a) occurs in response to generation of the first request;

generating a second request to overwrite the old second data with new second data, wherein (d) occurs in response to generation of the second request;

wherein, after (h) occurs, the data volume is restored to the data state it occupied before the first request was generated.

16. The computer readable memory of claim 6 wherein the method further comprises associating a first time stamp with the copy of the old first data stored in the first memory.

17. The computer readable memory of claim 16 wherein the method further comprises associating the first time stamp with the copy of the new first data stored in the second memory.

18. The method of claim 1 further comprising an act of associating a first time stamp with the copy of the old first data stored in the roll-back memory.

19. The method of claim 18 further comprising an act of associating the first time stamp with the copy of the new first data stored in the roll-forward memory.

20. The method of claim 19 further comprising an act of associating the first time stamp with the copy of the new first data stored in the roll-forward memory.

21. The method of claim 2 further comprising an act of associating a first time stamp with the copy of the old first data stored in the roll-back memory.

22. The method of claim 18 further comprising an act of associating a second time stamp with the copy of the old second data stored in the roll-back memory, wherein the first and second time stamps are different.

\* \* \* \* \*